US012579367B2

(12) United States Patent
Tang et al.

(10) Patent No.: US 12,579,367 B2
(45) Date of Patent: Mar. 17, 2026

(54) TWO-TOWER NEURAL NETWORK FOR CONTENT-AUDIENCE RELATIONSHIP PREDICTION

(71) Applicant: Microsoft Technology Licensing, LLC, Redmond, WA (US)

(72) Inventors: Xueqian Tang, Mountain View, CA (US); Lijun Peng, Sunnyvale, CA (US); Jiarui Wang, Sunnyvale, CA (US); Yi Zhang, Sunnyvale, CA (US); Yi Wu, Palo Alto, CA (US); Arvind Subramaniam, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 173 days.

(21) Appl. No.: 18/388,726

(22) Filed: Nov. 10, 2023

(65) Prior Publication Data

US 2025/0156641 A1      May 15, 2025

(51) Int. Cl.
G06F 40/30 (2020.01)

(52) U.S. Cl.
CPC .................................... G06F 40/30 (2020.01)

(58) Field of Classification Search
CPC ............................ G06F 40/30; G06Q 30/0631
See application file for complete search history.

(56) References Cited

U.S. PATENT DOCUMENTS

2022/0335489 A1* 10/2022 Rao Karikurve .. G06Q 30/0603
2022/0358366 A1   11/2022 Lee
2024/0289863 A1*  8/2024 Smith Lewis ......... G06N 3/008
2024/0346082 A1* 10/2024 Kumar .............. G06F 16/90332

FOREIGN PATENT DOCUMENTS

WO       WO-2024177735 A1 *  8/2024   ............... G06N 3/08

OTHER PUBLICATIONS

Wang, Ruoxi, et al. "Improving Relevance Prediction with Transfer Learning in Large-scale Retrieval Systems." Proceedings of the 1st Adaptive & Multitask Learning Workshop. 2019. (Year: 2019).*

(Continued)

*Primary Examiner* — Paras D Shah
(74) *Attorney, Agent, or Firm* — KDW Firm PLLC

(57) ABSTRACT

In an example embodiment, a generator model such as a large language model (LLM) is leveraged to generate embeddings for both pieces of content and users. The embeddings map the pieces of content and the users into the same latent n-dimensional space. The embeddings are then fine-tuned using a two-tower deep neural network, with one of the towers representing users and the other tower representing content. The two-tower deep neural network is trained to optimize the embeddings over some shared goal, such as user engagement with content, and uses information such as user interactions with content in that process. A clustering technique, such as K-nearest neighbor (kNN) can then be used to identify a grouping of top user/content pairs based on similarity between users and content, as reflected in the embeddings. For a given piece of content, therefore, the top users from that cluster can then be recommended as an audience for the content.

18 Claims, 7 Drawing Sheets

(56) <div style="text-align:center">References Cited</div>

<div style="text-align:center">OTHER PUBLICATIONS</div>

Unger, Moshe, et al. "Bridging Listeners with Artists: Deep Multi-Objective Multi-Stakeholder Music Recommendations." NYU Stern School of Business Forthcoming (2021).*

Yu, Yantao, et al. "A dual augmented two-tower model for online large-scale recommendation." DLP-KDD (2021).*

Xin, S. H. E. N., et al. "ATNN: adversarial two-tower neural network for new item's popularity prediction in E-commerce." 2021 IEEE 37th International Conference on Data Engineering (ICDE). IEEE, 2021.*

Li, Xiangyang, et al. "Inttower: the next generation of two-tower model for pre-ranking system." Proceedings of the 31st ACM International Conference on Information & Knowledge Management. 2022.*

Zu, Chuan-Long, CN117009575-A. Translation, 2023.*

Wu, Xue-chao, CN116955793-A, Translation, 2023.*

Wu, Xue-chao, CN116911949-A, Translation, 2023.*

Li, Shao-bo, CN116150471A, Translation, 2023.*

Pan, Ying-ji, CN-111242748-B, Translation, 2023.*

Wang, Ying, CN113469752A, Translation 2021.*

International Search Report and Written Opinion received for PCT Application No. PCT/US2024/050862, Jan. 31, 2025, 13 pages.

* cited by examiner

500

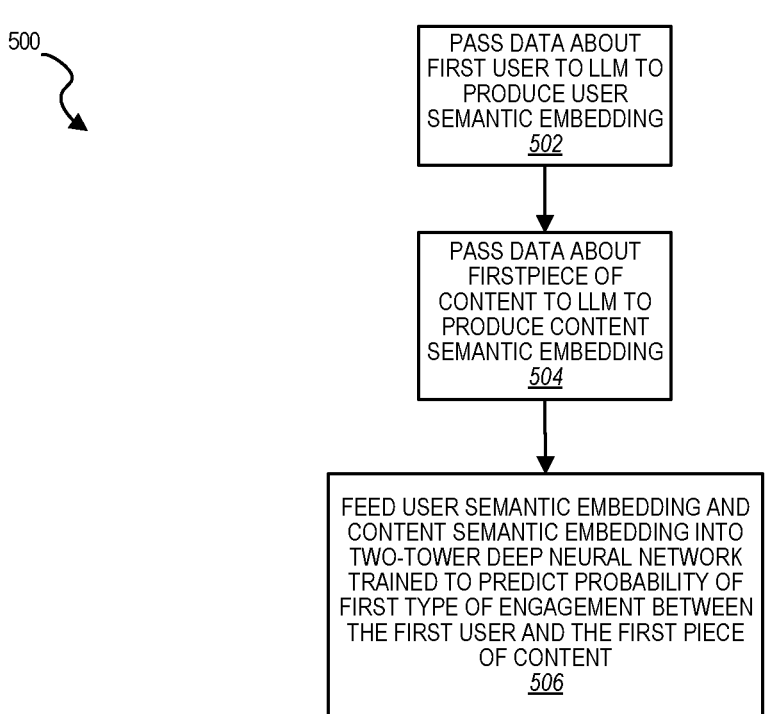

PASS DATA ABOUT
FIRST USER TO LLM TO
PRODUCE USER
SEMANTIC EMBEDDING
*502*

PASS DATA ABOUT
FIRSTPIECE OF
CONTENT TO LLM TO
PRODUCE CONTENT
SEMANTIC EMBEDDING
*504*

FEED USER SEMANTIC EMBEDDING AND
CONTENT SEMANTIC EMBEDDING INTO
TWO-TOWER DEEP NEURAL NETWORK
TRAINED TO PREDICT PROBABILITY OF
FIRST TYPE OF ENGAGEMENT BETWEEN
THE FIRST USER AND THE FIRST PIECE
OF CONTENT
*506*

*FIG. 5*

TWO-TOWER NEURAL NETWORK FOR CONTENT-AUDIENCE RELATIONSHIP PREDICTION

TECHNICAL FIELD

The present disclosure generally relates to technical problems encountered in machine learning. More specifically, the present disclosure relates to a two-tower neural network for content-audience relationship prediction.

BACKGROUND

The rise of the Internet has occasioned two disparate yet related phenomena: the increase in the presence of online networks, such as social networking services, with their corresponding user profiles visible to large numbers of people, and the increase in the use of these online networking services to provide content. An example of such content is advertising content, but similar issues can arise with many different types of content. In the advertising content example, advertisements (also known as sponsored content) may be posted to a social networking service to be presented to users of the social network service, oftentimes in conjunction with non-advertisement content (also known as organic content). For example, advertisements may be interspersed in a social networking feed on the social networking service, with a feed being a series of various pieces of content presented in reverse chronological order, along with non-advertisement content such as a combination of notifications, articles, and job listings.

BRIEF DESCRIPTION OF THE DRAWINGS

Some embodiments of the technology are illustrated, by way of example and not limitation, in the figures of the accompanying drawings.

FIG. 5 is a flow diagram illustrating a method, in accordance with an example embodiment.

DETAILED DESCRIPTION

Overview

Figure 1:
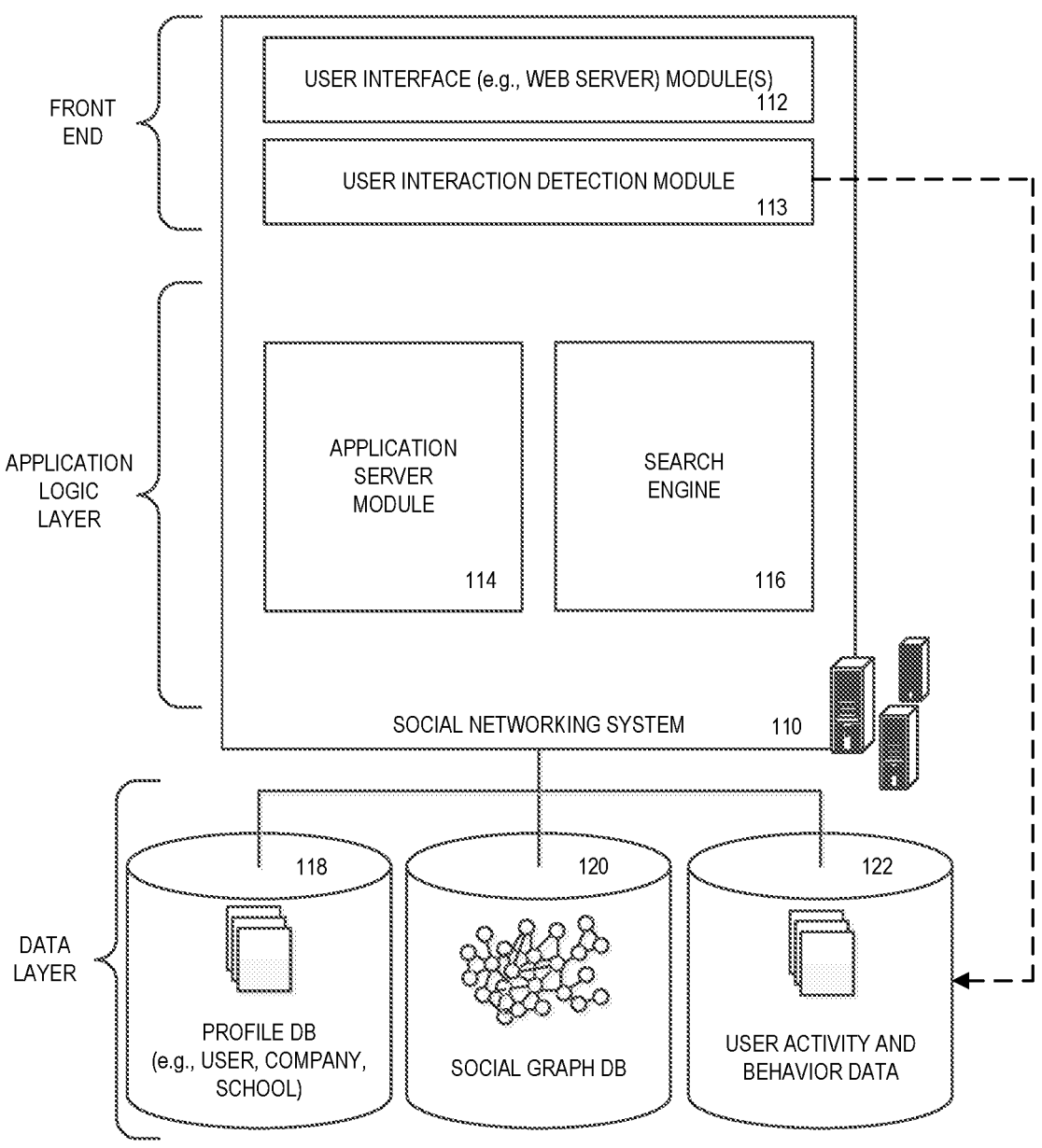
FIG. 1 is a block diagram showing the functional components of a social networking service, including a data processing module referred to herein as a search engine, for use in generating and providing search results for a search query, consistent with some embodiments of the present disclosure.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

Selection of an audience for a piece of content can be challenging. Creating campaigns is complex and selecting an appropriate audience can be difficult for inexperienced campaign managers. A mis-configured audience for a piece of content can negatively impact campaign performance. What is needed is a solution that recommends appropriate audience segments for a piece of content.

A similar challenge exists in the other direction. Even if a desired audience is known, selecting the appropriate content for that audience can be difficult for inexperienced campaign managers. What is needed is a solution that is also able to recommend appropriate content for a given audience segment.

Technical problems are encountered with implementing such a solution, however. To the extent that machine learning has been used previously to solve similar problems, these solutions have involved using separate models trained independently from one another to make different types of predictions. For example, if one wanted to predict an ideal audience for a piece of content then a first machine learning model would be used, while if one wanted to predict an ideal piece of content for a particular audience, then a second machine learning model would be used. It takes time, however, to train both models and because they are trained independently from another, there are insights that are gained during the training of one of the model that are not carried over into the other model.

Additionally, traditional machine learning techniques relied upon keywords associated with the content (e.g., tags) being used to reflect the meaning of the content. But such keywords are often a crude measurement of the exact meaning of the content, often relying on the content producer to add their own keywords accurately in order for the machine learning to get accurate information from which to base its recommendations. On the audience side as well, it can be difficult for machine learning techniques to gain an understanding of the preferences, habits, and motivations of potential audience members, often relying on crude measures for such understanding, such as details explicitly listed in a user profile. Thus, even if a machine learning technique itself may produce accurate results, it only does so under perfect circumstances, where the crude measures of content happen to be accurate and the crude measures of user intent happen to be accurate, neither of which is commonplace in real-world scenarios, let alone both. Furthermore, the machine learning techniques themselves can be improved upon.

In an example embodiment, generator model such as a large language model (LLM) is leveraged to generate embeddings for both the pieces of content and users. The embeddings map the pieces of content and the users into the same latent n-dimensional space. The embeddings are then fine-tuned using a two-tower deep neural network, with one of the towers representing users and the other tower representing content. The two-tower deep neural network is trained to optimize the embeddings over some shared goal, such as user engagement with content, and uses information such as user interactions with content in that process. A clustering technique, such as K-nearest neighbor (kNN), can then be used to identify a grouping of top user/content pairs based on similarity between users and content, as reflected in the embeddings. For a given piece of content, therefore, the top users from that cluster can then be recommended as an audience for the content. Alternatively, for a given audience of users, the top pieces of content from the cluster containing the given audience can be recommended as content for that audience.

Furthermore, a bi-directional approach to machine learning model training can be utilized where insights gained during training a first model are carried over into the training of a second model, and vice-versa.

Description

In an example embodiment, novel machine learning techniques are used to recommend an audience (e.g., a group of users) for a particular piece of content in an online network. The machine learning techniques may involve training and using an audience recommendation model.

In some example embodiments, the audience recommendation model may be implemented with a large "flywheel" of models. This flywheel is described in more detail below, but it generally involves a system where multiple machine learning models are trained over a shared goal. Nevertheless, nothing in this disclosure shall be taken as limiting the implementation of the audience recommendation model to be within a flywheel, unless otherwise stated. A flywheel implementation is merely one possible implementation of the audience recommendation model presented herein.

As to the flywheel, many social networking services, and online portals in general, have multiple different components that handle various elements of a piece of content's lifecycle. An advertisement, for example, may be created in one component, while an audience for the content is determined using a different component, and a bid price for the piece of content may be automatically determined using yet another component. Each of these components may utilize machine learning models to perform various tasks, but due to the separateness of these components, the machine learning models operate independently of one another, leading to various inefficiencies.

A flywheel enables end-to-end automation across many different components in an online network. End-to-end optimization is a machine-learning approach where the entire system, from input to output, is optimized as a whole, without breaking down the system into separate components for the purpose of optimization. In other words, the optimization is performed over the entire pipeline of the system, rather than optimizing each component separately. In this particular case, the end-to-end optimization may be accomplished through a combination of embedding-based retrieval, privacy-preservation modelling, multi-task learning, reinforcement learning, and generative artificial intelligence (GAI).

This optimization process allows components to interact with each other, with each component relying on some aspect of at least one other component for joint optimization. This integrated approach allows for a seamless and efficient process to optimize various online network activities, such as content and/or advertising display, geared towards a unified goal. Additionally, it creates a closed optimization cycle where each component potentially interacts with each other, with the flywheel connecting and sharing knowledge among previously isolated optimization components to improve outcomes. For example, insights from measuring qualified leads and audience signals can be used to continuously improve model performance and drive further outcome optimization.

An online network may contain various different components, each programmed to perform a different task. Some of these components may utilize one or more machine learning models in the furtherance of those tasks. These machine learning models, however, are optimized independently of one another. In other words, each model is trained independently to one another to optimize a different goal. While there have been some efforts made to train co-existing machine learning models to optimize a single goal by, for example, training those machine learning models together, such efforts have been limited to machine learning models within the same component of an online network and thus have more traditionally overlapping goals.

In some online networks, however, the components perform significantly different tasks from one another, making training co-existing machine learning models from different components technically challenging. In other words, it is difficult to optimize models located in completely distinct components and with different functionality on one or more shared goals.

For example, in an online network hosting and presenting content, with promoted (i.e., paid) content presented as well, there may be a relevance component dedicated to improving content results by adjusting bidding and delivery strategies, based on aspects such as conversions and lead quality; an audience component dedicated to identifying the correct audience, based on aspects such as audience expansion; a creative component dedicated to ensuring that the right message is delivered to promote engagement with the online network; and a customer experience component dedicated to streamlining a campaign management process.

Furthermore, in an example embodiment, a user need only supply a small seed of information, such as the objective, and from there the end-to-end optimization flywheel is able to provide suggestions for the predicted target audience, the ad content, and the bidding and delivery mechanisms by leveraging information known about the user, their prior ad campaigns, and their known products (e.g., product pages).

These disparate components may all be created and managed using artificial intelligence-driven optimizations, specifically by using one or more machine learning models to make predictions about likelihoods of certain events happening and then optimizing actions based on the goals of the components. For example, the relevance optimization model may contain a machine learning model for conversion prediction that outputs a prediction of a likelihood that presenting a paid piece of content will result in some sort of downstream benefit to the entity that paid for the piece of content to be displayed (such as a sale based on a presented advertisement, or an application for a job associated with a presented job listing). That model, however, is basically trained to optimize for conversions, which may be a different goal than, for example, a machine learning model used by the audience component, which may be trained to optimize for user engagement.

As to the audience engagement component, in an example embodiment, a GAI model implemented as an generator model such as an LLM may be used to generate one or more embeddings for content and users. These embeddings may then be fine-tuned using a two-tower deep neural network, and the embeddings then clustered using a clustering technique such as kNN, which produces a grouping of users to be recommended for each piece of content (or alternatively, grouping of multiple pieces of content).

Two-tower deep neural networks utilize a single neural network that combines two neural networks working in parallel, one that maps user features to user embeddings and one that maps content features to a content embedding. The output of the combination neural network is a dot product of the outputs of the two individual neural networks.

More particularly, in a two-tower network, a first neural network contains an embedding layer and hidden layer, and a second neural network contains an embedding layer and a hidden layer. Given feature vectors, the two towers provide embedding functions that encode the features to an n-dimensional embedding space. This is performed by optimizing both towers towards a single goal.

In an example embodiment, the machine learning algorithm used to train the two-tower deep neural network may iterate among various weights (which are the parameters) that will be multiplied by various input variables and evaluate a loss function at each iteration, until the loss function is minimized, at which stage the weights/parameters for that stage are learned. Specifically, the weights are multiplied by the input variables as part of a weighted sum operation, and the weighted sum operation is used by the loss function.

With respect to the GAI model, this model may be used to generate the initial embeddings (that will be fine-tuned using the two-tower deep neural network), but it could also be used to, in lieu of or in conjunction with the generation of embeddings, generate some or all of the content itself. GAI refers to a class of artificial intelligence techniques that involves training models to generate new, original data rather than simply making predictions based on existing data. These models learn the underlying patterns and structures in a given dataset and can generate new samples that are similar to the original data.

Some common examples of GAI models include Generative Adversarial Networks (GANs), Variational Autoencoders (VAEs), and autoregressive models. These models have been used in a variety of applications such as image and speech synthesis, music composition, and the creation of virtual environments and characters.

When a GAI model generates new, original data, it goes through the process of evaluating and classifying the data input to it. In an example embodiment, the product of this evaluation and classification is utilized to generate embeddings for data, rather than using the output of the GAI model directly. Thus, for example, passing a user profile from an online network to a GAI model might ordinarily result in the GAI model creating a new, original user profile that is similar to the user profile passed to it. In an example embodiment, however, the new, original user profile is either not generated or is discarded. Rather, an embedding for the user profile is generated based on the intermediate work product of the GAI model that it would produce when going through the motions of generating the new, original user profile.

More particularly, the GAI model is used to generate content understanding in the form of the embeddings, rather than (or in addition to) generating content itself.

In an example embodiment, the GAI model is implemented as a generative pre-trained transformer (GPT) model or a bidirectional encoder. A GPT model is a type of machine learning model that uses a transformer architecture, which is a type of deep neural network that excels at processing sequential data, such as natural language.

A bidirectional encoder is a type of neural network architecture in which the input sequence is processed in two directions: forward and backward. The forward direction starts at the beginning of the sequence and processes the input one token at a time, while the backward direction starts at the end of the sequence and processes the input in reverse order.

By processing the input sequence in both directions, bidirectional encoders can capture more contextual information and dependencies between words, leading to better performance. Each direction has its own hidden state, and the final output is a combination of the two hidden states.

The bidirectional encoder may be implemented as a Bidirectional Long Short-Term Memory (BiLSTM) or Bidirectional Encoder Representations from Transformers (BERT) model.

Long Short-Term Memories (LSTMs) are a type of recurrent neural network (RNN) that are designed to overcome the vanishing gradient problem in traditional RNNs, which can make it difficult to learn long-term dependencies in sequential data.

LSTMs include a cell state, which serves as a memory that stores information over time. The cell state is controlled by three gates: the input gate, the forget gate, and the output gate. The input gate determines how much new information is added to the cell state, while the forget gate decides how much old information is discarded. The output gate determines how much of the cell state is used to compute the output. Each gate is controlled by a sigmoid activation function, which outputs a value between 0 and 1 that determines the amount of information that passes through the gate.

In BiLSTM, there is a separate LSTM for the forward direction and the backward direction. At each time step, the forward and backward LSTM cells receive the current input token and the hidden state from the previous time step. The forward LSTM processes the input tokens from left to right, while the backward LSTM processes them from right to left.

The output of each LSTM cell at each time step is a combination of the input token and the previous hidden state, which allows the model to capture both short-term and long-term dependencies between the input tokens.

BERT applies bidirectional training of a model known as a transformer-to-language modelling. This is in contrast to prior art solutions that looked at a text sequence either from left to right or combined left to right and right to left. A bidirectionally trained language model has a deeper sense of language context and flow than single-direction language models.

More specifically, the transformer encoder reads the entire sequence of information at once, and thus is considered to be bidirectional (although one could argue that it is, in reality, non-directional). This characteristic allows the model to learn the context of a piece of information based on all of its surroundings.

In other example embodiments, a GAN embodiment may be used. GAN is a supervised machine learning model that has two sub-models: a generator model that is trained to generate new examples and a discriminator model that tries to classify examples as either real or generated. The two models are trained together in an adversarial manner (using a zero-sum game, according to game theory), until the discriminator model is fooled roughly half the time, which means that the generator model is generating plausible examples.

The generator model takes a fixed-length random vector as input and generates a sample in the domain in question. The vector is drawn randomly from a Gaussian distribution, and the vector is used to seed the generative process. After training, points in this multidimensional vector space will correspond to points in the problem domain, forming a compressed representation of the data distribution. This vector space is referred to as a latent space or a vector space comprised of latent variables. Latent variables, or hidden variables, are those variables that are important for a domain but are not directly observable.

The discriminator model takes an example from the domain as input (real or generated) and predicts a binary class label of real or fake (generated).

Generative modeling is an unsupervised learning problem, as we discussed in the previous section, although a property of the GAN architecture is that the training of the generative model is framed as a supervised learning problem.

The two models, the generator and discriminator, are trained together. The generator generates a batch of samples, and these, along with real examples from the domain, are provided to the discriminator and classified as real or fake.

The discriminator is then updated to get better at discriminating real and fake samples in the next round, and importantly, the generator is updated based on how well, or not, the generated samples fooled the discriminator.

In another example embodiment, the GAI model is a VAE model. VAEs comprise an encoder network that compresses the input data into a lower-dimensional representation, called a latent code, and a decoder network that generates new data from the latent code.

In either case, the GAI model contains a generative classifier, which can be implemented as, for example, a naïve Bayes classifier. It is the output of this generative classifier that can be leveraged to obtain embeddings, which can then be used as input to a separately trained machine learning model.

The above generally describes the overall process as used during inference-time (when the machine learning model makes the predictions about each piece of content being considered for display in the feed), but the same or similar process of content understanding/embedding can be performed during training as well. Specifically, for some features of the training data used to train the machine learning model, those features are passed into the GAI model to generate an embedding that provides content understanding for those corresponding features. Thus, for example, in the case of a machine learning model used to predict propensity to interact with feed items, the training data may include historical information about past feed items displayed to users, user profile data about those users, and interaction information indicating when those users interacted with the various feed items. From that, for example, the past feed items may be passed one at a time into the GAI model to generate a corresponding embedding, and then the embeddings from the feed items can be used along with the features from the user profile data and interaction information to train the machine learning model using a machine learning algorithm.

In some example embodiments, the GAI model is used to generate single-dimension embeddings as opposed to multidimensional embeddings. A single-dimension embedding is essentially a single value that represents the content understanding. One specific way that the single-dimension embedding can be represented is as a category. Thus, in these example embodiments, the GAI model generates a category for a particular input piece of content. The categories may either be obtained by the GAI model from a fixed set of categories, or the categories may be supplied to the GAI model when the GAI model is generating the embedding (e.g., at the same time the piece of content is fed into the GAI model to be categorized).

In some example embodiments, the GAI model itself generates its own categories. In this case, the query to the GAI model may be something broad, such as "what is this piece of content about," which allows the GAI model to generate a free-form description of the piece of content without being restricted to particular categories.

The other advantage to using a GAI model for content understanding of content to be fed to another machine learning model is that the GAI model is robust enough to handle content from different domains. The various pieces of content may be in completely separate types of domains (e.g., one may be textual, another may be a video). Additionally, even when the pieces of content are in similar domains (e.g., they are both textual), their formatting could be completely different (e.g., a news article is generally longer and uses a different writing style than a user posting an update about a job promotion they have received). The GAI model is able to handle content of different domains and actually share some of its understanding across those domains (e.g., feedback it has received about a user post about a recent court decision can influence its understanding about a new article about the court decision, or other court decisions).

As such, in an example embodiment, the GAI model is applied to content from different domains, such as text images and video. The GAI model is robust enough to understand the meaning of the text in the same way it is able to understand the meaning of the video. Thus, for example, if the content involves an advertisement for a soda, the GAI model is robust enough to understand that phrases that contain the words "cola," "soda", or other similar terms have the same underlying meaning as an image of an aluminum soda can in a video.

FIG. 1 is a block diagram showing the functional components of a social networking service, including a data processing module referred to herein as a search engine, for use in generating and providing search results for a search query, consistent with some embodiments of the present disclosure.

As shown in FIG. 1, a front end may comprise a user interface module 112, which receives requests from various client computing devices and communicates appropriate responses to the requesting client devices. For example, the user interface module(s) 112 may receive requests in the form of Hypertext Transfer Protocol (HTTP) requests or other web-based Application Program Interface (API) requests. In addition, a user interaction detection module 113 may be provided to detect various interactions that users have with different applications, services, and content presented. As shown in FIG. 1, upon detecting a particular interaction, the user interaction detection module 113 logs the interaction, including the type of interaction and any metadata relating to the interaction, in a user activity and behavior database 122.

An application logic layer may include one or more various application server modules 114, which, in conjunction with the user interface module(s) 112, generate various user interfaces (e.g., web pages) with data retrieved from various data sources in a data layer. In some embodiments, individual application server modules 114 are used to implement the functionality associated with various applications and/or services provided by the social networking service.

As shown in FIG. 1, the data layer may include several databases, such as a profile database 118 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 118. Similarly, when a representative of an organization initially registers the organization with the social networking service, the representative may be prompted to provide certain information about the organization. This information may be stored, for example, in the profile database 118 or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the social networking service. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 120.

As users interact with the various applications, services, and content made available via the social networking service, the users' interactions and behavior (e.g., content viewed, links or buttons selected, messages responded to, etc.) may be tracked, and information concerning the users' activities and behaviors may be logged or stored, for example, as indicated in FIG. 1, by the user activity and behavior database 122. This logged activity information may then be used by a search engine 116 to determine search results for a search query.

Although not shown, in some embodiments, a social networking system 110 provides an API module via which applications and services can access various data and services provided or maintained by the social networking service. For example, using an API, an application may be able to request and/or receive one or more recommendations. Such applications may be browser-based applications or may be operating system-specific. In particular, some applications may reside and execute (at least partially) on one or more mobile devices (e.g., phone or tablet computing devices) with a mobile operating system. Furthermore, while in many cases the applications or services that leverage the API may be applications and services that are developed and maintained by the entity operating the social networking service, nothing other than data privacy concerns prevents the API from being provided to the public or to certain third parties under special arrangements, thereby making the navigation recommendations available to third-party applications and services.

Although the search engine 116 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 116 facilitates the indexing and searching for content within the social networking service, such as the indexing and searching for data or information contained in the data layer, such as profile data (stored, e.g., in the profile database 118), social graph data (stored, e.g., in the social graph database 120), and user activity and behavior data (stored, e.g., in the user activity and behavior database 122). The search engine 116 may collect, parse, and/or store data in an index or other similar structure to facilitate the identification and retrieval of information in response to received queries for information. This may include, but is not limited to, forward search indexes, inverted indexes, N-gram indexes, and so on.

At a threshold level, the present solution provides for the connecting of isolated optimization components and the continued automation of each component through artificial intelligence technologies.

Figure 2:
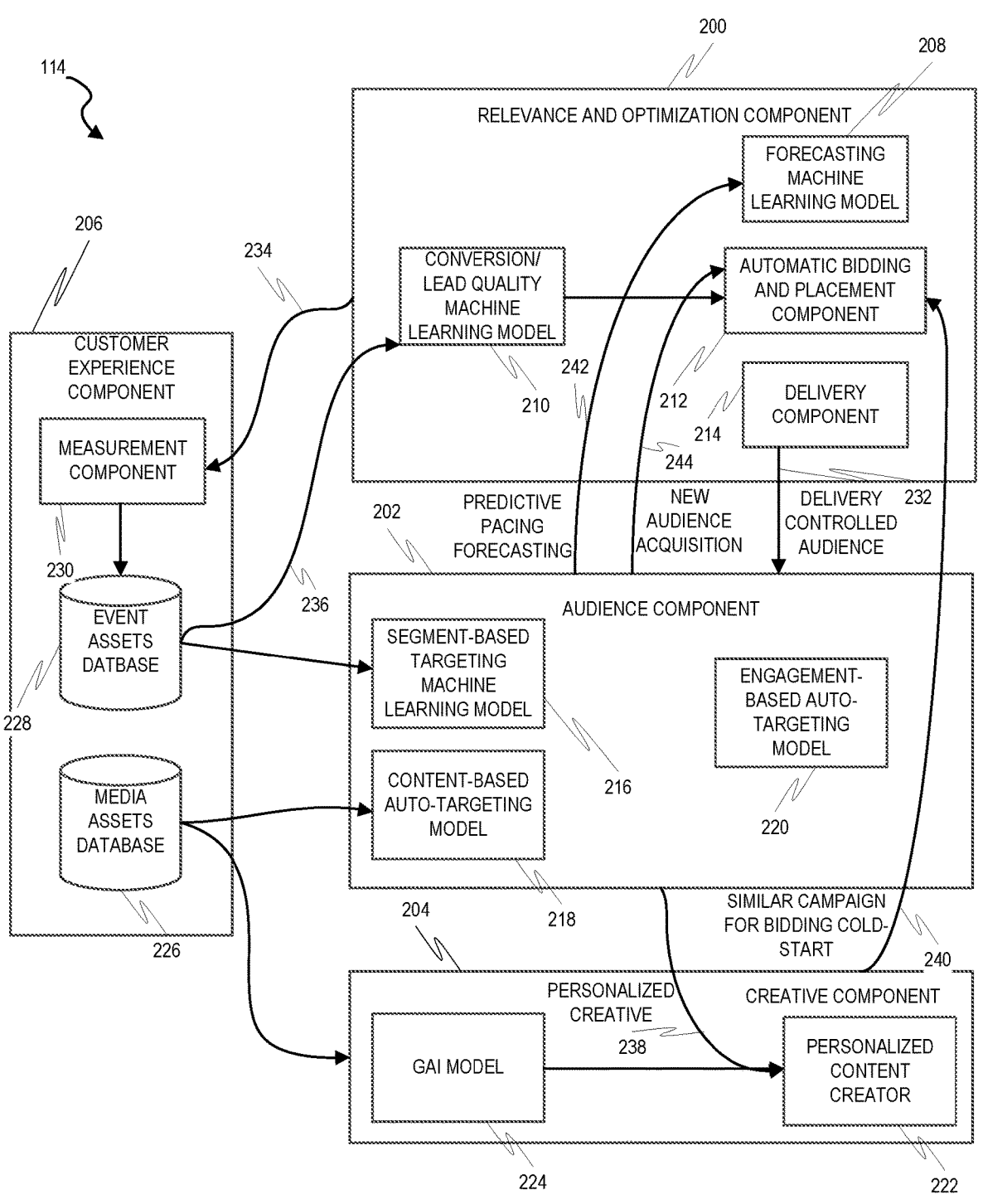
FIG. 2 is a block diagram illustrating the application server module of FIG. 1 in more detail, in accordance with an example embodiment.

FIG. 2 is a block diagram illustrating the application server module 114 of FIG. 1 in more detail, in accordance with an example embodiment. While in many embodiments the application server module 114 will contain many subcomponents used to perform various different actions within the social networking system 110, in FIG. 1, only those components that are relevant to the present disclosure are depicted. Additionally, while a single application server module 114 is depicted here as containing many different components, in some example embodiments some or all of the different components may be located on different application server modules, and even some of the components may be located on client devices such as user devices.

Here, application server module 114 may contain a relevance and optimization component 200, an audience component 202, a creative component 204, and a customer experience component 206. It should be noted that even though this figure depicts these components as residing on a single application server module 114, in implementation, it is possible that one or more of these components may reside on different application server modules 114, potentially located at different geographical locations.

Also contained somewhere in application server module 114 will be embeddings. In some example embodiments, a repository for embeddings is maintained in the application server module 114 but in other example embodiments the embeddings are stored in other data stores. These embeddings will be described in more detail below.

The relevance and optimization component 200 improves advertising campaign results by adjusting bidding and delivery strategies. The building blocks for such goals may include, for example, conversion optimization, lead quality modeling, automatic bidding, automatic placement, dynamic margin (e.g., revenue minus costs), automatic format, dynamic group format, lifetime pacing, pacing forecast (e.g., forecast about when advertising budgets will be used up), and ads relevance. Thus, as depicted here, the relevance and optimization component 200 may include a forecasting machine learning model 208, a conversion/lead quality machine learning model 210, an automatic bidding and placement component 212, and a delivery component 214. The forecasting machine learning model 208 acts to predict future ad spending in a campaign. For example, it may utilize general predictive pacing forecasting information passed to it from the audience component 202 about the predicted pace of spending of advertisements traditionally displayed to the predicted audience and may generate a more specific pace of spending forecast for this particular advertising campaign.

The audience component 202 identifies a correct audience for content (at scale). The building blocks for this goal may include, for example, audience expansion and predictive audience (predicting an audience for content). Thus, as depicted here, the audience component 202 may include a segment-based targeting machine learning model 216, a content-based auto-targeting model 218, and an engagement-based auto-targeting model 220. The engagement-based auto-targeting model provides a prediction of which audience members to target (e.g., which users to include in the audience) based on a likelihood of each of these audience members engaging with the content. This may include using information known about audience members, such as user profiles and/or information about prior engagement by users to make these predictions.

The term "engagement" can be defined as some sort of interaction with the content. The exact form of this interaction can vary based on the type of user interface used for the engaging and how "success" is measured in the system. For example, in some scenarios, clicking on or otherwise selecting a piece of content for viewing is enough to count as engagement, but in other scenarios the engagement may be defined as some action subsequent to mere clicking on or selecting the content, such as making a purchase (where the piece of content is an advertisement for the product purchased) or applying for a job (where the piece of content is a job listing).

The creative component 204 ensures that the right message is delivered to promote engagement. The building blocks for this goal may include, for example, a personalized content creator 222 and a GAI model 224.

The customer experience component 206 streamlines the campaign management process. The building blocks for this goal may include, for example, a campaign manager, a business event manager, and an event/quality signal tracking. The customer experience component 206 may contain a media assets database 226, which supplies raw content and content-related information (such as text, video, and/or images used by the GAI model 224 to create new content in text, video, and/or video format). The GAI model 224 is capable of creating new content from scratch or capable of generating variants of existing content. In some examples, the GAI model 224 may also use existing content on the customer's product page to generate content, such as an advertisement based on the content in the customer's product page For example, contents from the customer's product page may be stored at the media assets database 226 or may be fed to the GAI model 224 directly from the customer's product page. The customer experience component 206 may further contain an event assets database 228 that contains information relating to events that occur related to user interaction with content. More particularly, measurements, such as a measurement taken by the relevance and optimization component 200, may be obtained by a measurement component 230 and stored in the event assets database 228 to be later used by the conversion/lead quality machine learning model 210. In some examples, the measurements may include conversion rate (percentage of users who take a desired action), engagement (e.g., number of likes, comments, etc), click-through-rate (percentage of recipients who click on the content), and time on site.

To facilitate end-to-end optimization of all of these components in FIG. 2, connections between the components may be established in a manner that allows for such cross-component optimization. Specifically, connections between certain components can themselves be trained to optimize over some goal. For example, connection 232 in FIG. 2 is between relevance and optimization component 200 and audience component 202. A goal here may be to ensure that bidding on content does not get too high for a narrow audience, which would impair conversions. Thus, if the system as a whole determines that such a goal is not being met or might not be met if certain criteria related to bidding are strictly enforced, those criteria may be relaxed to find the nearest relevant audience to expand the audience for that particular content delivery to a wide enough level to ensure that the goal is met. Connection 232 is labeled "delivery controlled audience" because the audience itself (which is determined in the audience component 202) can be adjusted based on the delivery parameters (which are determined in the relevance and optimization component 200). Training of a model for this connection 232 uses tracking data to track the delivery parameters and the audience segments being served by the delivery.

Other connections, such as connection 234 between relevance and optimization component 200 and customer experience component 206 may not require training a model. Here, for example, the relevance and optimization component 200 may obtain feedback from delivery providers, such as advertisers, regarding performance (such as conversion rates). This information can then be passed via connection 234 to the customer experience component 206. This information may then be aggregated by a measurement component 230 and stored in an event assets database 228. The aggregated data can then be used by the relevance and optimization component 200 via connection 236 as an input to the conversion/lead quality machine learning model 210

Another example of a connection with a model that is learned via training includes connection 238, labeled "personalized creative." Here, based upon the targeting intent from the audience component 202, a different piece of content (e.g., ad copy) may be generated in the creative component 204 to appeal to the specific audience determined in the targeting intent.

Another example of a connection that is learned via training includes connection 240, labeled "similar campaign for bidding cold-start." The information generated via this connection involves information about what advertising campaigns might be similar to the present advertising campaign, which may be used when the user or user's company has no prior advertising campaign information to draw from (a so-called "cold-start" scenario).

Another example of a connection that is learned via training includes connection 242, labeled "predictive pacing forecasting." The information generated via this connection involves information about the pace at which advertising campaigns generally would be predicted to spend on advertising to users within a predicted audience.

Another example of a connection that is learned via training includes connection 244, labeled "new audience acquisition." The information generated via this connection involves information about a predicted audience for the content.

The result of these connections is that an end-to-end flywheel is achieved. For example, for conversion optimization, which identifies deeper conversion opportunities through enhanced bidding, end-to-end deep learning models can be implemented across multiple conversion models, such as straight conversion, lead generation, and talent lead models, which makes it possible to extend functionality to a multi-layered model structure to incorporate additional conversion signals. Furthermore, third party conversion signals can be further leveraged in conversion optimization, such as offline conversions, customer relationship management, qualified leads, converted leaders, etc., to improve existing conversion models and build lead quality models. This provides valuable supplemental conversion signals in a privacy landscape. To achieve this, a two-layer federated learning model with privacy protection may be implemented. Additionally, a multi-task learning model may be built that differentiates leads by quality.

For delivery of content via the delivery component 214, in content marketplace optimization, bidding automation automatically adjusts bid prices in real-time to improve the efficiency and effectiveness of a campaign, and budget automation allows for optimized budget allocation across different ad placements and campaigns. More particularly, reinforcement learning-based bidding algorithms can be used across multiple bidding products, such as automatic bidding, manual bidding, and cost cap bidding, and can also be extended to achieve automated delivery across other products. The bidding models can also incorporate additional signals such as audience and forecasting, as well as extending delivery automation across campaign groups.

Regarding audience, audience creation allows content providers to automatically reach the right audience at the right time with optimized campaign performance, thereby connecting members with the most relevant opportunities. Embedding-based audience creation (auto targeting) can be provided and can also be extended to create predictive audiences, which incorporates content provider signals to generate audiences for optimal outcomes. Furthermore, in some example embodiments, delivery controlled audience serving can be provided, which converts audiences into parameters for tuning campaign performance by connecting it with budget delivery. To solve the cold-start problem when manual audience selection is discarded, additional signals can be incorporated from media assets, advertiser profiles, landing page content, etc., to establish content-based audience automation with a generator model and GAI.

For the cold-start scenario, an initial audience can be generated, and content-based GAI model 224 may be used. More specifically, given text content (creative content, landing page content, text prompts, etc.), the key facet attributes can be predicted and summarized to jump-start campaign serving. Furthermore, GAI may be leveraged to generate embeddings of the content to serve as pre-trained embeddings in a two-tower model trained using member-creative engagement data.

For creatives, creative optimization ensures that the right message is delivered to promote engagement. A personalized content creator 222 may be defined that creates a single location for uploading, managing, and selecting media for ad creation.

Referring back to the automatic bidding and placement component 212, in an example embodiment, initial prices for pieces of sponsored content, called base bids, are set based on predictions of subsequent interactions with the sponsored pieces of content and daily budgets for the sponsored pieces of content. For example, one or more machine learned models may be used to predict the number of clicks, applications, and/or other types of interactions with a sponsored piece of content over a day based on historical time-series data associated with the interactions. An initial price for the sponsored piece of content may then be calculated by dividing the sponsored piece of content's daily budget by the predicted number of interactions. In an example embodiment, this predicted number of interactions is based on a corrected version of the number of impressions from the previous day.

Figure 3:
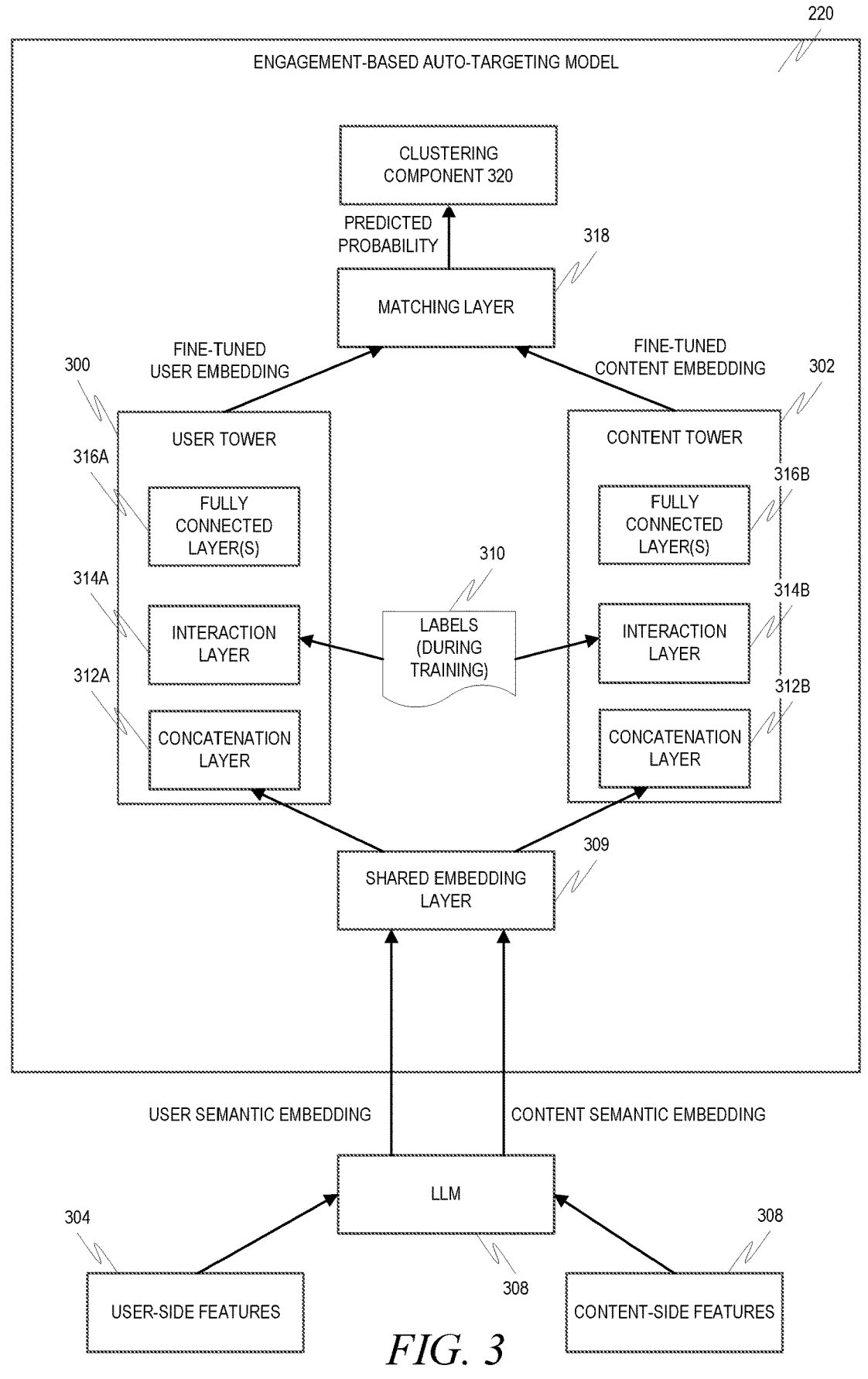
FIG. 3 is a block diagram illustrating an engagement-based auto-targeting model, in accordance with an example embodiment.

FIG. 3 is a block diagram illustrating an engagement-based auto-targeting model 220, in accordance with an example embodiment. Here, the engagement-based auto-targeting model 220 is a two-tower deep neural network. The two towers include a user tower 300 and a content tower 302. It should be noted that is also possible to have a single tower to generate both embeddings in the shared dimensional space. User-side features 304 from user data, including user attributes and activity (i.e., usage) data, and content-side features 306 from content data, including content attributes, are fed into a generator model 308 to obtain one or more semantic embeddings. For example, the generator model 308 may produce a single user semantic embedding for each user's user-side features 304 and a single content semantic embedding for each piece of content's content-side features 306. Both the user semantic embeddings and the content semantic embeddings, however, may be within the same latent n-dimensional space, and are handled by a shared embedding layer 309. As used here, the term "semantic embedding" refers to an embedding derived from semantic information, such as text/language.

It should be noted that during training time, the user-side features 304 and the content-side features 306 may be drawn from training data, namely data (either data gathered from actual user activities in the past or specially generated data) that has been labelled with an indication of a probability of engagement. Thus, depicted here are labels 310 that reflect the result of this labelling process. Labels 310 are only used during the training of the engagement-based auto-targeting model 220, and during inference time the engagement-based auto-targeting model 220 is essentially predicting the probability of engagement rather than having it explicitly provided to it in a label. The labels 310 may be in various forms, based on the implementation of the engagement-based auto-targeting model 220. Each label is applied to a different user-piece of content pair. Thus, a first label may be assigned to the combination of user A and content X, a second label may be assigned to the combination of user A and content Y, and a third label may be assigned to a combination of user B and content X. Each label reflects the "probability" that the corresponding user engaged with the corresponding piece of content. In scenarios where the training data is derived from actual past user interactions with content, then the user either did or did not engage with the piece of content, and thus the labels themselves may be binary in nature, specifically a "0" may be assigned if the corresponding user did not engage with the corresponding piece of content, and a "1" may be assigned if the corresponding user did engage with the corresponding piece of content. In some example embodiments, however, the labels may be assigned using some non-binary probability score, such as a number between 0 and 1.

Each tower 300, 302 contains a concatenation layer 312A, 312B, an interaction layer 314A, 314B, and one or more fully connected layers 316A, 316B, to produce a fine-tune embedding (either fine-tuned user embedding or fine-tuned content embedding). These layers 312A, 312B, 314A, 314B, 316A, 316B work together to fine-tune the embedding passed to it from the shared embedding layer 309.

The concatenation layer 312A, 312B takes inputs and concatenates them along a specified dimension. The interaction layer 314A, 314B manages the interactions between the concatenation layer 312A, 312B, the labels 310, and the fully connected layer(s) 316A, 316B. The fully-connected layer(s) 316A, 316B comprise a collection of artificial neurons. Each neuron in the layer is connected to each neuron in the previous layer and the subsequent layer. This means that each neuron receives input from all the neurons in the previous layer and sents its output to all neurons in the next layer. Each connection between neurons has an associated weight, which determines the strength of the connection. Additionally, each neuron can have a bias term. These weights and biases are learned during training, such as by using gradient descent. A non-linear activation function is applied to the weighted sum of inputs for each neuron.

Thus, during training, the labels 310 are used by the interaction layer 314A, 314B to train or retrain the corresponding tower to better fine-tune embeddings.

At inference time, a matching layer 318 compares the fine-tuned user embedding and the fine-tuned content embedding for a given user-piece of content pair to produce a predicted probability of the corresponding user interacting with the corresponding piece of content. This comparison may, in some example embodiments, involve performing a geometric measurement of the distance between the fine-tuned user embedding and the fine-tuned content embedding in the latent n-dimensional space, such as by using a cosine distance calculation.

The predicted probability for a corresponding user-piece of content pair, as well the predicted probabilities for any other user-piece of content pairs that are potentially being considered, can then be passed to a clustering component 320, which performs a kNN procedure on the embeddings and probabilities to identify a grouping of top user/content pairs based on similarity between users and content, as reflected in the embeddings. For a given piece of content, therefore, the top users from that cluster can then be recommended as an audience for the content. Alternatively, for a given audience, the top pieces of content from that cluster can be recommended to be presented to the audience. Thus, the two-tower model is able to create embeddings for both users and content within a single shared n-dimensional space, allowing predictions about users and content to be performed bidirectionally, meaning that comparison of user embeddings and content embeddings can be used to make decisions about which content to present to particular users but also make decisions about to which users to present particular content. To this point in the disclosure, the discussion has been about making predictions of probabilities of engagements of a single engagement type. For example, the engagement type predicted using the architecture in FIG. 3 may be a probability of clicking or otherwise selecting the piece of content. Thus, in that scenario, the architecture in FIG. 3 has essentially been trained to optimize on accurately predicting the probability of a user in the audience clicking on or otherwise selecting the piece of content. In some environments, however, it may be beneficial to train the architecture to optimize over multiple types of interactions. For example, rather than optimizing over the probability of the user clicking on or otherwise selecting the piece of content, optimization can occur over both the probability of the user clicking on or otherwise selecting the piece and the probability of one or more down-funnel tasks, such as lead generation, conversions, dwell time, etc. In an example embodiment, the architecture may be designed for multi-task learning, where it learns related tasks in parallel leveraging of a shared representation. The learnings of each task help with better learning of other tasks and thus improves generalizations.

Figure 4:
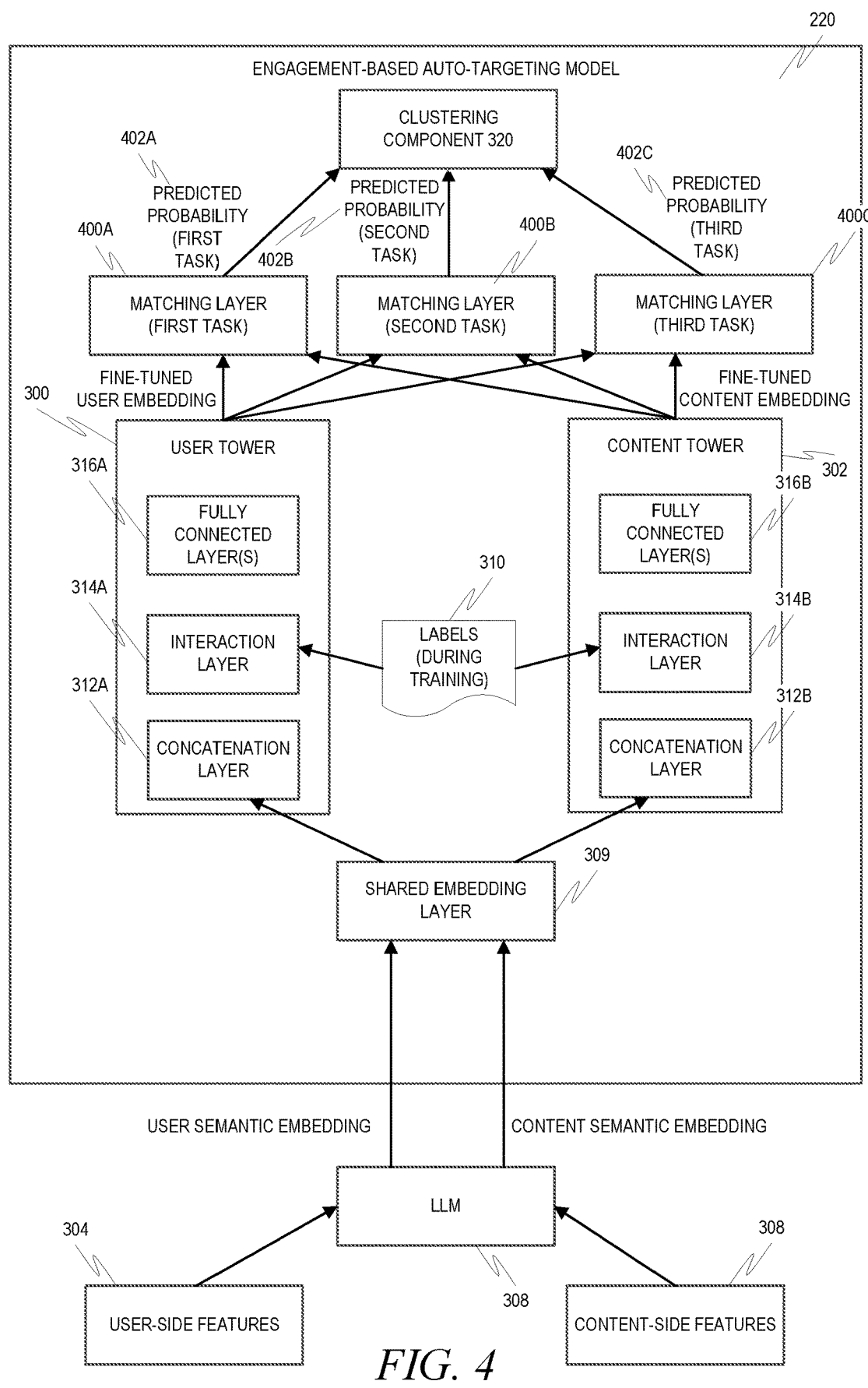
FIG. 4 is a block diagram illustrating an engagement-based auto-targeting model, in accordance with another example embodiment.

FIG. 4 is a block diagram illustrating an engagement-based auto-targeting model 220, in accordance with another example embodiment. Here, the engagement-based auto-targeting model 220 is implemented as a multi-task two-tower deep neural network. The architecture is similar to that of FIG. 3, except that there is a separate matching layer 400A, 400B, 400C for each task. Thus, matching layer 400A may produce a probability 402A of a given user clicking on or otherwise selecting a given piece of content, matching layer 400B may produce a probability 402B of a conversion (e.g., purchase of a corresponding product, application for a job) between the given user and the given piece of content, and matching layer 400C may produce a probability of the given user visiting a website associated with the given piece of content.

It should also be noted that the above describes how the two-tower neural network fine-tunes embeddings generated by a generator model such as an LLM, but the generator model itself can also be fine-tuned (or built from the ground up) for particular use cases, so that the semantic embedding generated by the generator model is specifically trained with less training data than a universal generator model (one trained on the English language in general, for example), using training data that pertains specifically for a given use case. Thus, if the content involved is job listings and only job listings, rather than use a generator model that is generally trained using many different types of content, a more-specific generator model is generated using just job listing training data.

It should also be noted that the two-tower deep neural network can be retrained based on actual interactions with content presented to users in an audience. For example, if the two-tower deep neural network is used to identify a predicted audience for a first piece of content, the first piece of content is displayed to users in the predicted audience and interactions between the users in the predicted audience and the first piece of content are measured. The two-tower deep neural network is then retrained based on the measured interactions, resulting in a new predicted audience being generated for the first piece of content using the retrained two-tower deep learning model.

In another example embodiment, the two-tower deep neural network can be retrained based on actual performance. More specifically, the two-tower deep neural network may be used to recommend an audience for a particular piece of content, or to recommend pieces of content for a particular audience, but in either case, a campaign may be begun where the piece or pieces of content is/are presented to the users in the audience. Interactions (e.g., clicks or other selections) between these users and the piece or pieces of content can then be measured and fed back into a training process for the two-tower deep neural network, essentially acting like labels for the actual data. Thus, for example, if a piece of content gets a large number of clicks for a given audience, this represents positive feedback and may cause the two-tower deep neural network to be retrained to favor that piece of content, or content like that piece of content, whereas if a piece of content gets relatively few, or even no, clicks for a given audience, this represents negative feedback and may cause the two-tower deep neural network to be retrained to disfavor that piece of content. Similar operations can be performed for recommended audiences.

Furthermore, actual interaction data can also be used to present insights (such as to a campaign manager) about why a particular campaign was or was not successful. Specifically, the user embeddings of the users in the audience of the campaign and the content embeddings for the pieces of content in the campaign can be used for the generation of such insights. For example, if a particular user in the audience did not respond to the campaign, the campaign manager may be presented with the insight that this user's user embedding was further from the pieces of contents' content embeddings than other user embeddings were, indicating that perhaps the user should not have been recommended as being part of the audience in the first place.

In some instances, the data used to generate the content semantic embedding by the generator model may be augmented by additional data relating to the piece of content being embedded. For example, if the piece of content is an advertisement for a company, in addition to the data about the advertisement (such as the text of the advertisement) itself being used by the generator model, information about the company, such as information extracted from a landing web page associated with the company's web address, may also be fed to the generator model in conjunction with the advertisement information, allowing for the content semantic embedding to be more robust and reliable. In some instances, in fact, information about the piece of content itself may be minimal or even absent, and the predictions made by the machine learning models will still be accurate because information related to that piece of content could still be used by the generator model to generate a content semantic embedding. This may be the case, for example, if the advertisement is brand new and may not have any associated text or description.

FIG. 5 is a flow diagram illustrating a method 500, in accordance with an example embodiment. At operation 502, data about a first user is passed to an LLM to produce a user semantic embedding. This data may include, for example, profile data or other data about the user themselves and interaction data, namely data about interactions by the user with various pieces of data. The user semantic embedding is a first point in a latent n-dimensional space, with the first point representing a semantic meaning of the data about the first user.

At operation 504, data about a first piece of content is passed to the LLM to produce a content semantic embedding. This data may include, for example, metadata of the content, text contained in the content, and interaction data, namely data about interactions by users with the first piece of content. The content semantic embedding is a second point in the latent n-dimensional space, the second point representing a semantic meaning of the data about the first piece of content.

At operation 506, the user semantic embedding and the content semantic embedding are fed into a two-tower deep neural network trained to predict a probability of a first type of engagement between the first user and the first piece of content. The two-tower deep neural network fine-tunes the user semantic embedding into a user embedding and the content semantic embedding into a content embedding. Each tower of the two-tower deep neural network may be trained using shared engagement data, meaning that each tower is trained using the same engagement data. The probability is then based on a geometric relationship between the user embedding and the content embedding.

The user embedding and the semantic embedding may then be compared along with other user embedding and content embeddings to either predict a best audience for a given piece of content or predict a best piece of content for a given audience.

The techniques described herein may be implemented with privacy safeguards to protect user privacy. Furthermore, the techniques described herein may be implemented with user privacy safeguards to prevent unauthorized access to personal data and confidential data. The training of the AI models described herein is executed to benefit all users fairly, without causing or amplifying unfair bias.

According to some embodiments, the techniques for the models described herein do not make inferences or predictions about individuals unless requested to do so through an input. According to some embodiments, the models described herein do not learn from and are not trained on user data without user authorization. In instances where user data is permitted and authorized for use in AI features and tools, it is done in compliance with a user's visibility settings, privacy choices, user agreement and descriptions, and the applicable law. According to the techniques described herein, users may have full control over the visibility of their content and who sees their content, as is controlled via the visibility settings. According to the techniques described herein, users may have full control over the level of their personal data that is shared and distributed between different AI platforms that provide different functionalities. According to the techniques described herein, users may have full control over the level of access to their personal data that is shared with other parties. According to the techniques described herein, personal data provided by users may be processed to determine prompts when using a generative AI feature at the request of the user, but not to train generative AI models. In some embodiments, users may provide feedback while using the techniques described herein, which may be used to improve or modify the platform and products. In some embodiments, any personal data associated with a user, such as personal information provided by the user to the platform, may be deleted from storage upon user request. In some embodiments, personal information associated with a user may be permanently deleted from storage when a user deletes their account from the platform.

According to the techniques described herein, personal data may be removed from any training dataset that is used to train AI models. The techniques described herein may utilize tools for anonymizing member and customer data. For example, user's personal data may be redacted and minimized in training datasets for training AI models through delexicalisation tools and other privacy enhancing tools for safeguarding user data. The techniques described herein may minimize use of any personal data in training AI models, including removing and replacing personal data. According to the techniques described herein, notices may be communicated to users to inform how their data is being used and users are provided controls to opt-out from their data being used for training AI models.

According to some embodiments, tools are used with the techniques described herein to identify and mitigate risks associated with AI in all products and AI systems. In some embodiments, notices may be provided to users when AI tools are being used to provide features.

Figure 6:
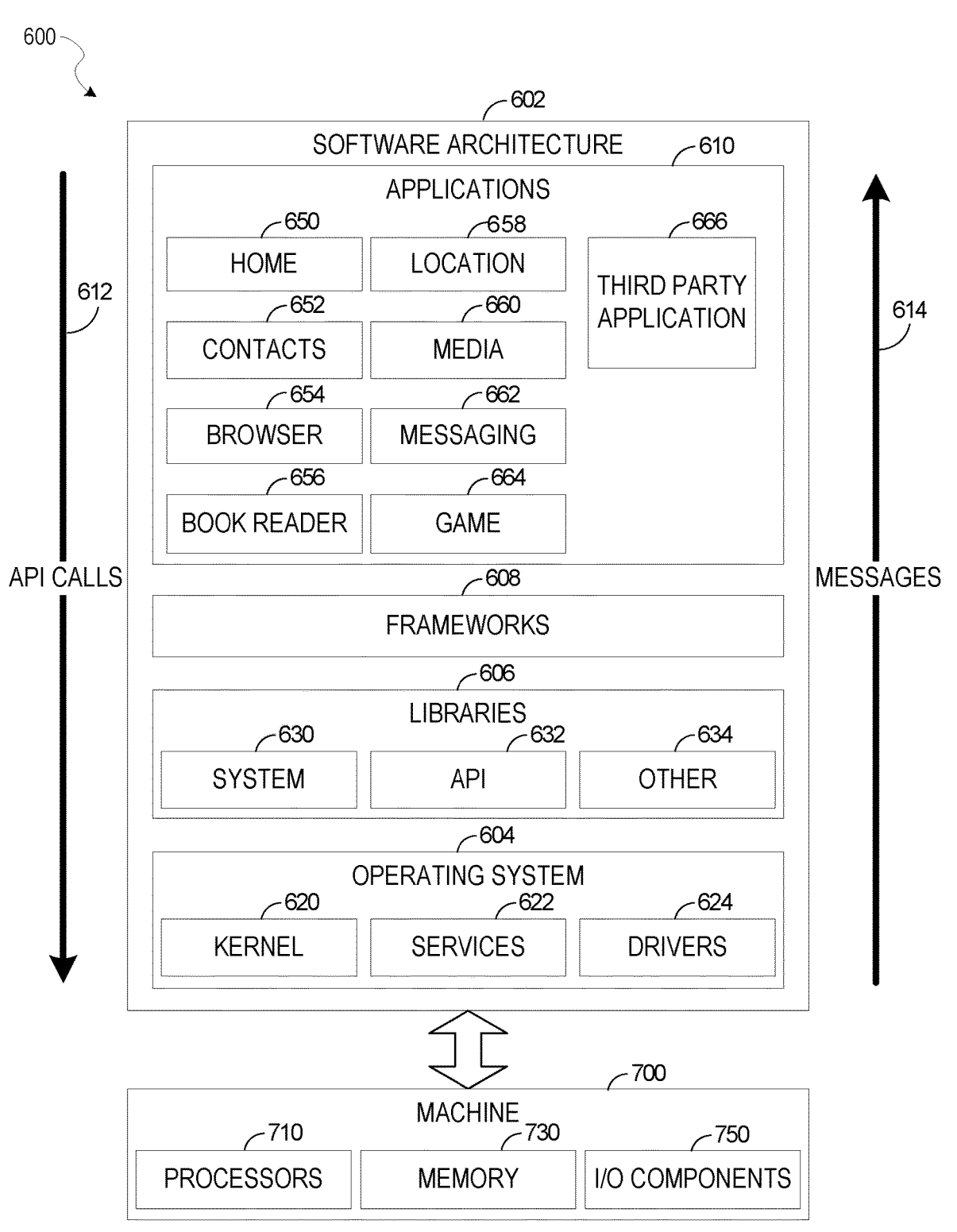
FIG. 6 is a block diagram illustrating a software architecture, in accordance with an example embodiment.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionalities. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphical user interface functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
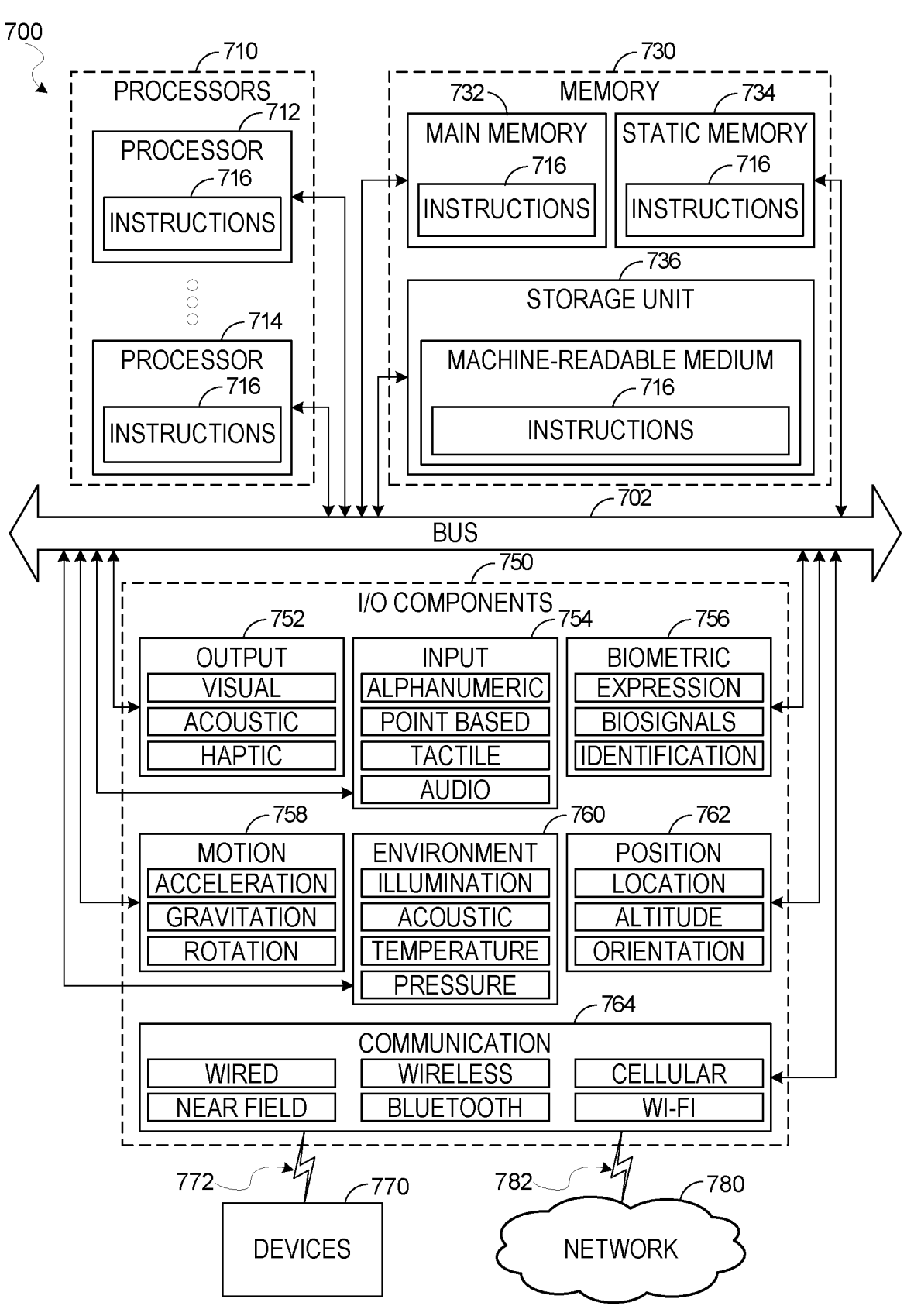
FIG. 7 illustrates a diagrammatic representation of a machine in the form of a computer system within which a set of instructions may be executed for causing the machine to perform any one or more of the methodologies discussed herein, according to an example embodiment.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein may be executed. For example, the instructions 716 may cause the machine 700 to execute the method 500 of FIG. 5. Additionally, or alternatively, the instructions 716 may implement FIGS. 1-5, and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors 712 (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor), multiple processors 710 with a single core, multiple processors 710 with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine 700 will depend on the type of machine 700. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photooptical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 716 and/or data. The terms shall accordingly be taken to include, but not be limited to, solid-state memories, and optical and magnetic media, including memory internal or external to the processors 710. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 716 may be transmitted or received over the network 780 using a transmission medium via a network interface device (e.g., a network interface component included in the communication components 764) and utilizing any one of a number of well-known transfer protocols (e.g., HTTP). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:

a non-transitory computer-readable medium having instructions stored thereon, which, when executed by a processor, cause the system to perform operations comprising:

passing data about a first user to a first generator model to produce a user semantic embedding, the user semantic embedding being a first point in a latent n-dimensional space, the first point representing a semantic meaning of the data about the first user;

passing the data about a first piece of content to the first generator model to produce a content semantic embedding, the content semantic embedding being a second point in the latent n-dimensional space, the second point representing a semantic meaning of the data about the first piece of content;

feeding the user semantic embedding and the content semantic embedding to a two-tower deep neural network trained to predict a probability of a first type of engagement between the first user and the first piece of content, the two-tower deep neural network fine-tuning the user semantic embedding into a user embedding and the content semantic embedding into a content embedding, each tower of the two-tower deep neural network trained using shared engagement data, the probability determined based on a geometric relationship between the user embedding and the content embedding;

predicting an audience based on the predicted probability and on other predicted probabilities for other users' interactions with the first piece of content;

causing display of the first piece of content to users in the predicted audience;

measuring interactions between the users in the predicted audience and the first piece of content; and retraining the two-tower deep neural network based on the measured interactions.

2. The system of claim 1, wherein the operations further comprise:

recommending the first piece of content be displayed to the first user in lieu of one or more other pieces of content to be displayed to the first user, based upon the predicted probability.

3. The system of claim 1, wherein the operations further comprise:

recommending the first piece of content be displayed to the first user in lieu of the first piece of content being displayed to one or more users, based upon the predicted probability.

4. The system of claim 1, wherein the shared engagement data includes information about interactions by users with landing pages of web sites associated with pieces of content.

5. The system of claim 1, wherein the two-tower deep neural network is trained to predict both a probability of a first type of engagement between the first user and the first piece of content and a probability of a second type of engagement between the first user and the first piece of content by training the two-tower deep neural network using a multi-task training technique.

6. The system of claim 5, wherein the training includes including a first matching layer for the first type of engagement and a second matching layer for the second type of engagement in the two-tower deep neural network.

7. The system of claim 1, wherein the operations further comprise:

causing one or more pieces of content to be presented in a first campaign to a group of users based on the geometric relationship between user embeddings of the group of users and content embeddings for the one or more pieces of content;

measuring a success rate of the first campaign based on interactions by users in the first group of users with the presented one or more pieces of content; and based on the success rate, presenting insights as to why the first campaign was or was not successful, using the user embeddings of the group of users and the content embeddings for the one or more pieces of content.

8. The system of claim 1, using a second generator model to generate a summary from a landing page associated with the first piece of content; and wherein the passing the data about the first piece of content to the first generator model includes passing the summary to the first generator model.

9. A method comprising:

passing data about a first user to a first generator model to produce a user semantic embedding, the user semantic embedding being a first point in a latent n-dimensional space, the first point representing a semantic meaning of the data about the first user;

passing the data about a first piece of content to the first generator model to produce a content semantic embedding, the content semantic embedding being a second point in the latent n-dimensional space, the second point representing a semantic meaning of the data about the first piece of content;

feeding the user semantic embedding and the content semantic embedding to a two-tower deep neural network trained to predict a probability of a first type of engagement between the first user and the first piece of content, the two-tower deep neural network fine-tuning the user semantic embedding into a user embedding and the content semantic embedding into a content embedding, each tower of the two-tower deep neural network trained using shared engagement data, the probability determined based on a geometric relationship between the user embedding and the content embedding;

predicting an audience based on the predicted probability and on other predicted probabilities for other users' interactions with the first piece of content;

causing display of the first piece of content to users in the predicted audience;

measuring interactions between the users in the predicted audience and the first piece of content; and retraining the two-tower deep neural network based on the measured interactions.

10. The method of claim 9, further comprising:

recommending the first piece of content be displayed to the first user in lieu of one or more other pieces of content to be displayed to the first user, based upon the predicted probability.

11. The method of claim 9, further comprising:

recommending the first piece of content be displayed to the first user in lieu of the first piece of content being displayed to one or more users, based upon the predicted probability.

12. The method of claim 9, wherein the shared engagement data includes information about interactions by users with landing pages of web sites associated with pieces of content.

13. The method of claim 9, wherein the two-tower deep neural network is trained to predict both a probability of a first type of engagement between the first user and the first piece of content and a probability of a second type of engagement between the first user and the first piece of content by training the two-tower deep neural network using a multi-task training technique.

14. The method of claim 13, wherein the training includes including a first matching layer for the first type of engagement and a second matching layer for the second type of engagement in the two-tower deep neural network.

15. The method of claim 9, further comprising:

causing one or more pieces of content to be presented in a first campaign to a group of users based on the geometric relationship between user embeddings of the group of users and content embeddings for the one or more pieces of content;

measuring a success rate of the first campaign based on interactions by users in the first group of users with the presented one or more pieces of content; and based on the success rate, presenting insights as to why the first campaign was or was not successful, using the user embeddings of the group of users and the content embeddings for the one or more pieces of content.

16. The method of claim 9, using a second generator model to generate a summary from a landing page associated with the first piece of content; and wherein the passing the data about the first piece of content to the first generator model includes passing the summary to the first generator model.

17. A non-transitory machine-readable storage medium comprising instructions which, when implemented by one or more machines, cause the one or more machines to perform operations comprising:

passing data about a first user to a first generator model to produce a user semantic embedding, the user semantic embedding being a first point in a latent n-dimensional space, the first point representing a semantic meaning of the data about the first user;

passing the data about a first piece of content to the first generator model to produce a content semantic embedding, the content semantic embedding being a second point in the latent n-dimensional space, the second point representing a semantic meaning of the data about the first piece of content;

feeding the user semantic embedding and the content semantic embedding to a two-tower deep neural network trained to predict a probability of a first type of engagement between the first user and the first piece of content, the two-tower deep neural network fine-tuning the user semantic embedding into a user embedding and the content semantic embedding into a content embedding, each tower of the two-tower deep neural network trained using shared engagement data, the probability determined based on a geometric relationship between the user embedding and the content embedding;

predicting an audience based on the predicted probability and on other predicted probabilities for other users' interactions with the first piece of content;

causing display of the first piece of content to users in the predicted audience;

measuring interactions between the users in the predicted audience and the first piece of content; and retraining the two-tower deep neural network based on the measured interactions.

18. The non-transitory machine-readable storage medium of claim 17, wherein the operations further comprise:

recommending the first piece of content be displayed to the first user in lieu of one or more other pieces of content to be displayed to the first user, based upon the predicted probability.

* * * * *